United States Patent [19]

Blaha et al.

[11] 4,184,333

[45] Jan. 22, 1980

[54] FLUID POWER SYSTEM

[75] Inventors: James G. Blaha, Painesville; Grant C. Melocik, Chardon; John E. Wible, Painesville, all of Ohio

[73] Assignee: Towmotor Corporation, Mentor, Ohio

[21] Appl. No.: 921,015

[22] Filed: Jun. 30, 1978

[51] Int. Cl.² ............................................. F15B 11/20
[52] U.S. Cl. ...................................... 60/420; 60/427; 60/DIG. 2; 91/532
[58] Field of Search ............ 60/420, 423, 427, DIG. 2; 91/516, 521, 525, 526, 532; 180/132, 142

[56] References Cited

U.S. PATENT DOCUMENTS

| | | | |
|---|---|---|---|
| 3,875,747 | 4/1975 | Briggs | 60/420 |
| 3,939,938 | 2/1976 | Inoue | 180/79.2 R |
| 3,991,846 | 11/1976 | Chichester et al. | 60/423 X |

*Primary Examiner*—Edgar W. Geoghegan
*Attorney, Agent, or Firm*—John L. James

[57] ABSTRACT

A fluid power system (10) for a lift truck (18) has a movable steering device (12) and a valve (14) which moves in response to movement of the steering device (12) a preselected amount to supply fluid power for steering the lift truck (18). Apparatus (30) is provided for controllably supplying fluid power to the valve (14) prior to the valve (14) moving to supply fluid power for steering. The apparatus (30) eliminates delay between the moving of the valve (14) and the availability of fluid power at the valve (14) to insure quick, responsive steering.

10 Claims, 6 Drawing Figures

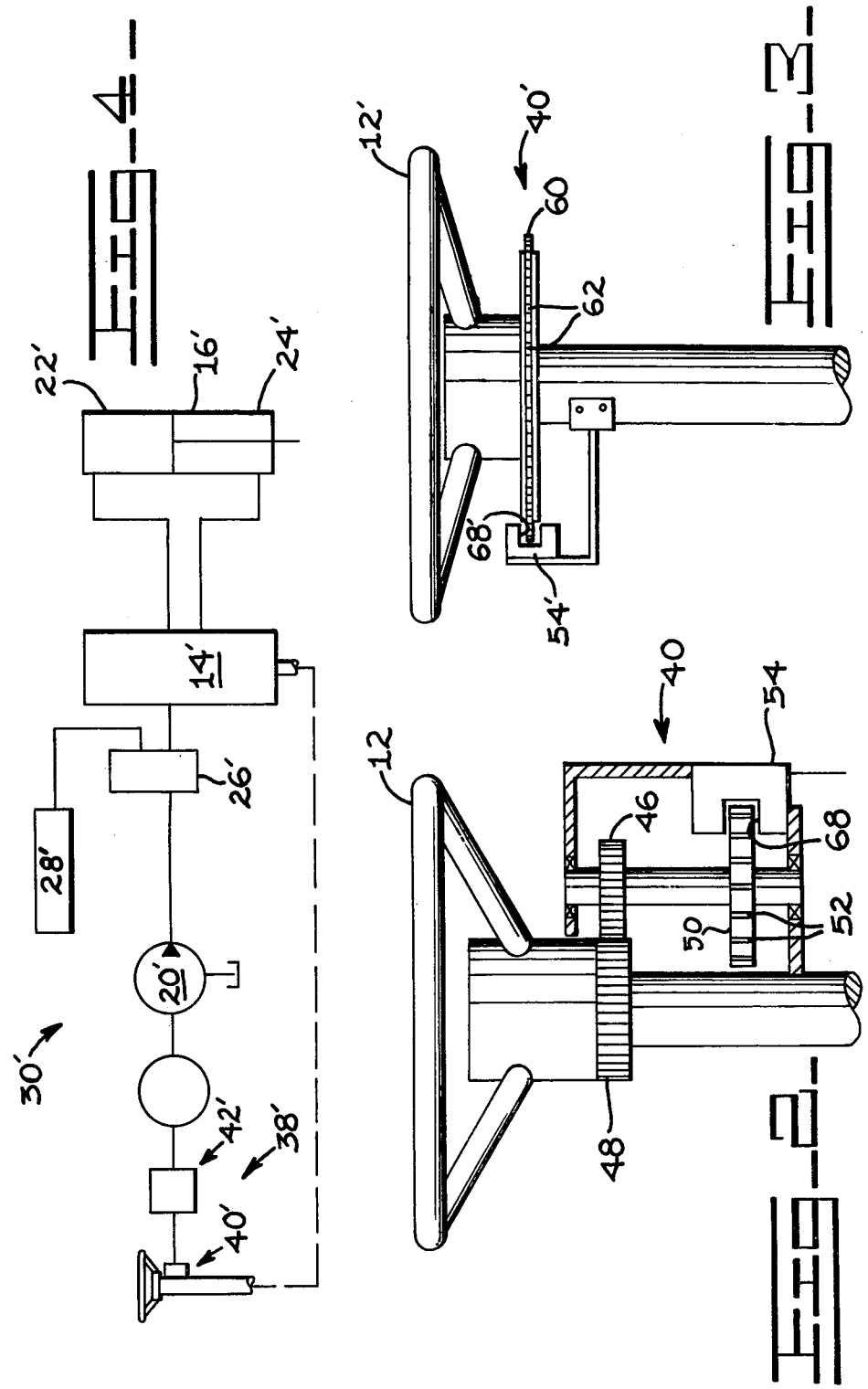

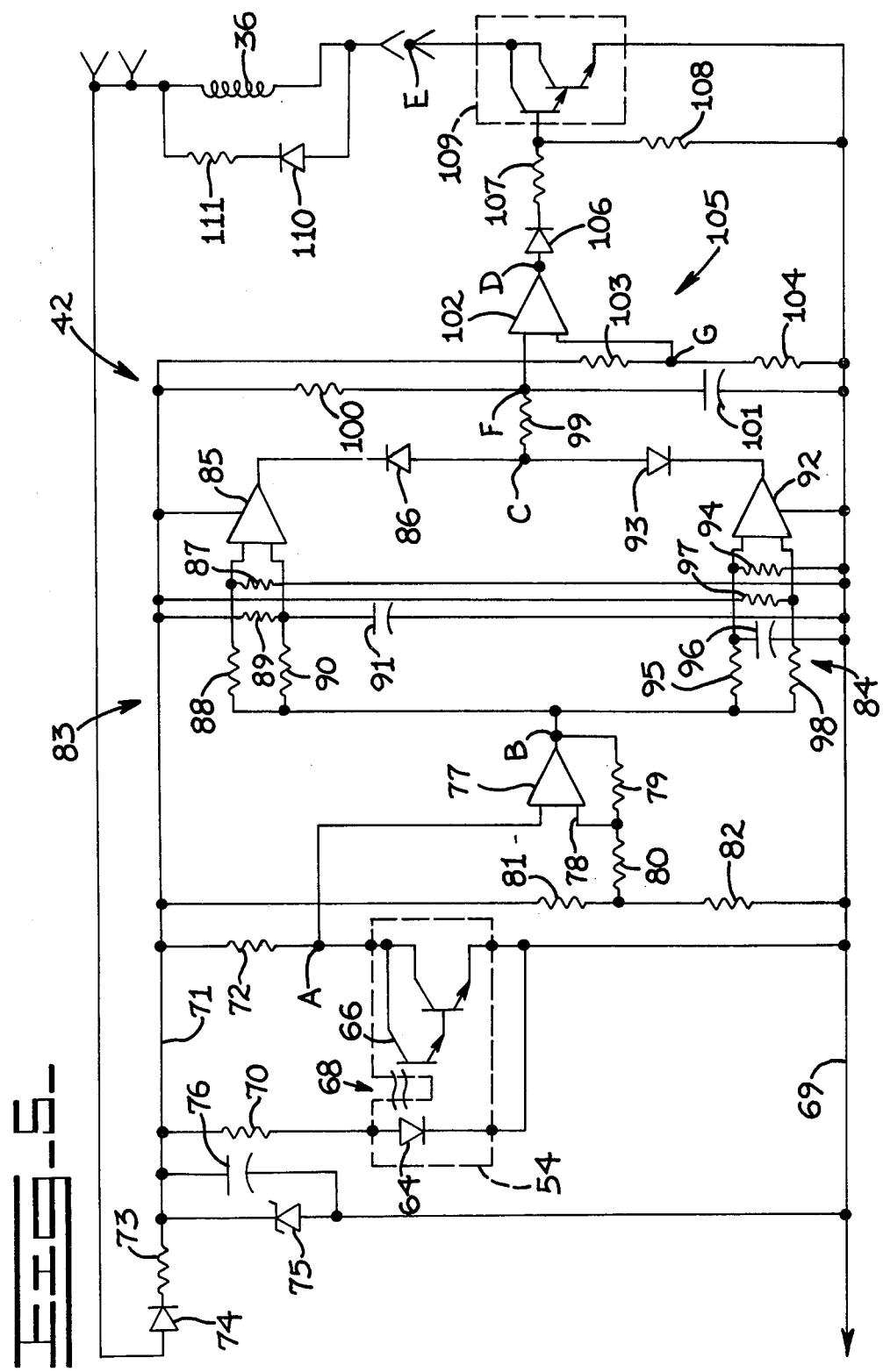

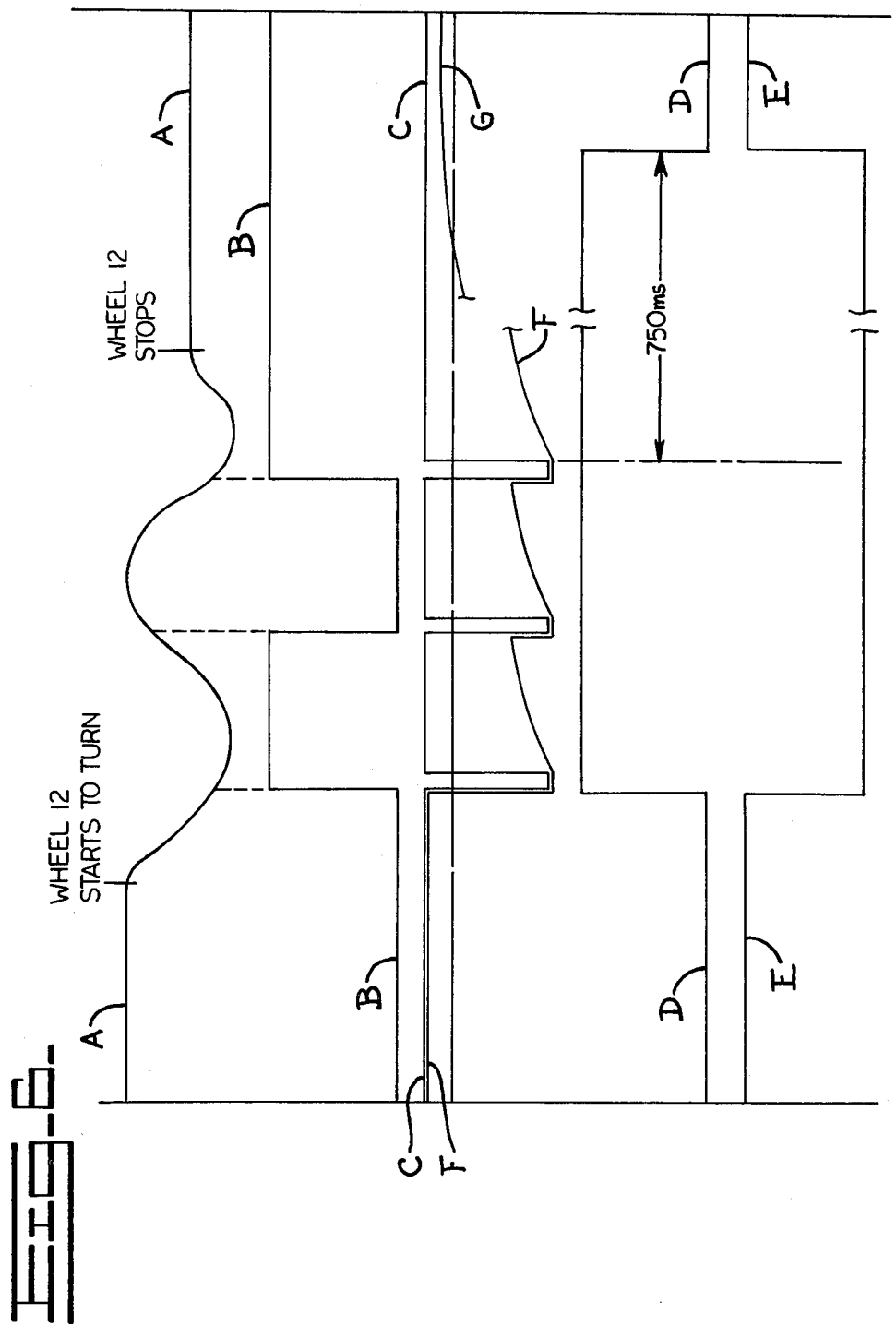

FLUID POWER SYSTEM

TECHNICAL FIELD

This invention relates to fluid power systems and more particularly to a power steering system.

Background Art

Power steering systems for vehicles, such as lift trucks, for example, typically use fluid power for steering the vehicle. The steering system has a valve which directs fluid power from a pump to a steering actuator when the steering wheel is rotated a preselected amount to steer the lift truck to the left or to the right. The steering wheel normally has a free play range, normally 5 to 7 degrees, and rotates within the range without operating the valve or directing fluid for steering to the steering actuator. The valve does not operate until the steering wheel rotates beyond the free play range causing a delay between the initial turning of the steering wheel and the availability of fluid power for steering at the valve. Quick responsive steering requires that the fluid power must always be available at the valve prior to operation of the valve.

The pump often supplies other vehicle systems, such as the fork and mast controls of the lift truck, by maintaining the pump output flow at a level sufficient for adequate steering speeds at all times during operation of the lift truck, but this method of operation is undesirable because it is inefficient, decreases pump life and wastes energy. The energy problem is compounded when the pump consumes stored electrical energy from the battery of the lift truck. In this situation, precious stored electrical energy is wasted when the pump operates unnecessarily; yet, the pump must run to supply fluid power to the valve without delay. It is desirable to supply fluid power for steering without delay and without unnecessary operation of the pump.

As mentioned, the valve shifts to direct fluid power to the steering motor when the steering wheel is rotated a preselected amount. Steering wheels normally have a free play range, which is highly desirable, in which the steering wheel rotates freely prior to actuation of the valve. The delay can be minimized by eliminating the free play of the steering wheel, but eliminating the free play causes the valve to shift whenever the steering wheel is rotated at all and causes increased loading of the pump whether the rotation is intentional or not. It is desirable to supply fluid power to the valve before the valve shifts to direct pressurized fluid to the steering actuator or motor without unnecessary operation of the pump.

U.S. Pat. No. 3,875,747 which issued on Apr. 8, 1975 to Kenneth Edward Briggs discloses a hydraulic control circuit for a self propelled lifting truck. A control unit varies pump output in response to operation of valve means which controls the flow of fluid to lifting and tilting cylinders. A metering means maintains a continuous metered flow of fluid in a steering supply circuit while the pump is in operation. However, the steering supply circuit is connected to the pump through a steering supply valve which operates the steering cylinders in the conventional manner in response to movement of the steering wheel.

U.S. Pat. No. 3,939,938 which issued on Feb. 24, 1976 to Naohiko Inoue discloses a power steering system which includes an electric control circuit. The circuit includes means responsive to turning of the steering wheel for producing a signal related to the angle and direction of turning of the steering wheel. The circuitry is very complicated, however, and therefore expensive. The steering wheel is of conventional design and therefore has a free play range in which steering is not affected.

U.S. Pat. No. 3,991,846 which issued on Nov. 16, 1976 to Willard L. Chichester and Howard C. Hansen discloses a power steering system for electric vehicles in which an electric drive motor for the supply pump of a power steering system is controlled by a motor control which is in turn controlled by the steering demand of the operator. The motor and pump are operated only during steering operations and only at the power level required for any steering demand. However, the successful operation of the pump and motor require the use of a second pump to initiate operation of the first pump and motor.

It is therefore desirable to have a steering system which requires only one pump, which is simple in design and construction, and which always provides fluid for steering prior to opening of the steering valve.

SUMMARY OF THE INVENTION

The present invention is directed to overcoming one or more of the problems as set forth above.

In one aspect of the present invention, a fluid power system has a movable steering control device which actuates a valve and apparatus operably connected in the system for supplying fluid power to the valve prior to actuation of the valve in response to movement of the steering device.

The present invention eliminates delay between the moving of the actuation of the valve and the availability of fluid power at the valve. This insures greater responsiveness between the moving of the steering control device and the moving of steering apparatus which operates when the valve actuates.

BRIEF DESCRIPTION OF THE DRAWINGS

FIG. 2 is a diagrammatic view of a steering device incorporating the present invention;

FIG. 3 is a diagrammatic view of another embodiment similar to FIG. 2;

FIG. 4 is a diagrammatic view of another embodiment of a fluid power system incorporating the present invention similar to FIG. 1;

FIG. 5 is a schematic diagram of the portion of FIG. 1 generally designated by reference numeral 38; and FIG. 6 is a graphical diagram showing waveforms at selected locations of FIG. 5.

DETAILED DESCRIPTION

Figure 1:
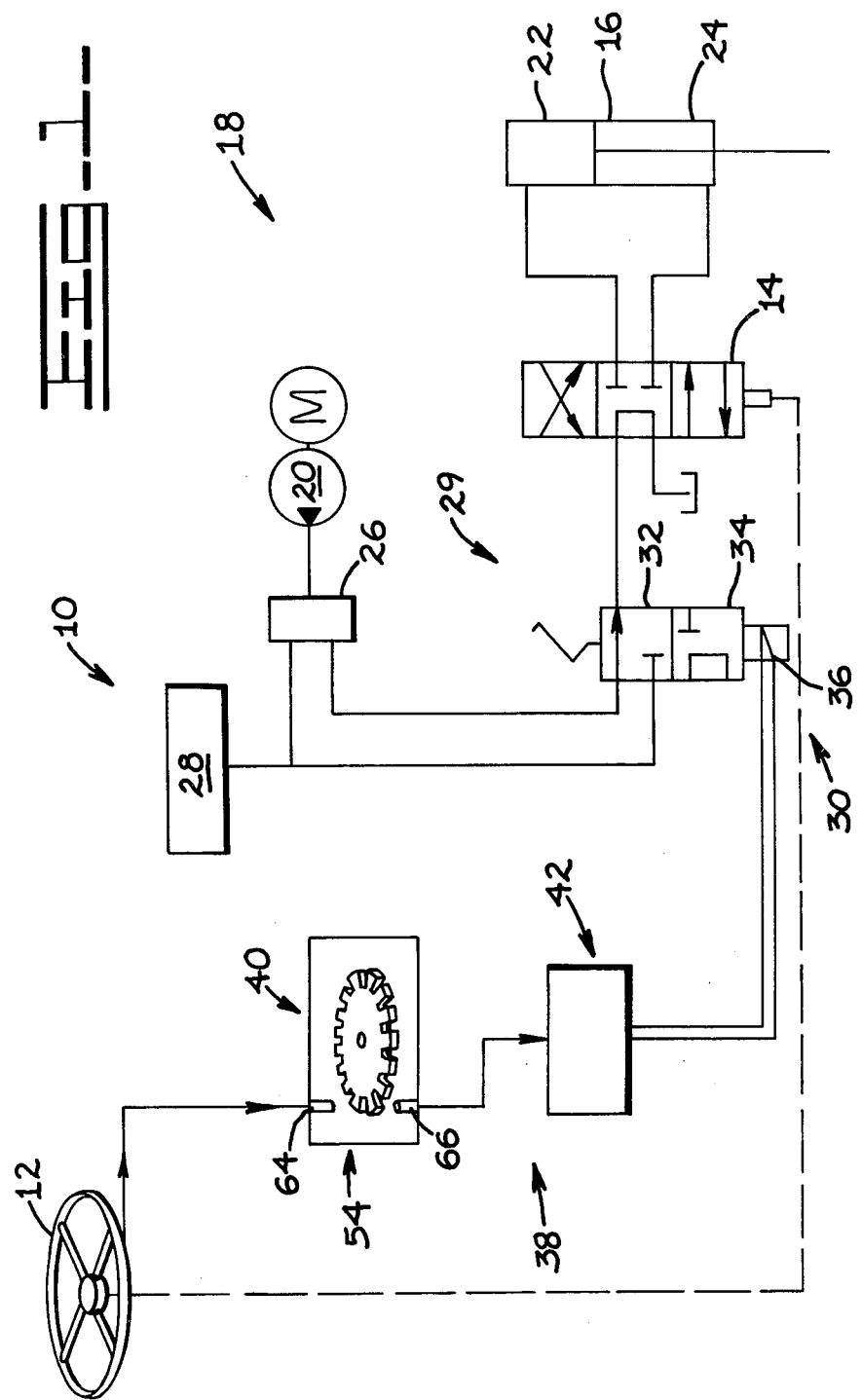
FIG. 1 is a diagrammatic view of a fluid power system incorporating the present invention.

Referring to FIG. 1, a fluid power system 10 has a movable steering device 12 such as a rotatable steering wheel 12, a modulatable teering valve 14 and one or more steering motors 16 for steering a vehicle, such as a lift truck 18. The steering wheel 12 rotates freely between a first neutral position at which the steering valve 14 is not shifted and the lift truck 18 travels in a straight path and a second steering demand position at which the valve 14 shifts and the vehicle 18 steers to the left or right. There is a range of positions between the first and second positions which is known in the art as the free play or dead band range. The steering wheel 12 is rotated to the left and right beyond the free play range to steer the vehicle to the left and right, respectively. The free play range exists whether the steering device 12 is a standard wheel, lever, pedal or other steering device.

The steering valve 14 is connected to the steering wheel 12 and steering motor 16 and moves between a first position at which motive power, preferably in the form of pressurized fluid from a pmp 20, to the steering motor 16 is blocked and a second position at which motive power is communicated to the steering motor 16 only in response to rotation of the steering wheel 12 to the left or right beyond the free play range as is well known in the art. The valve 14 returns to the centered position shown in FIG. 1 when the steering wheel 12 ceases to rotate as is well known in the art.

The steering motor 16 is preferably a double acting cylinder which has a head end 22 and a rod end 24. The steering motor 16 controls the vehicle wheels, vehicle articulation or both (not shown) for steering the lift truck 18 to the left and right. For example, turning the steering wheel 12 to the left or right beyond the free play range moves or shifts the valve 14 from the first position to the second position to direct pressurized fluid to the rod end 24 or head end 22 of the cylinder 16 for moving the wheels and steering the lift truck to the left or right, respectively.

The pump 20 preferably delivers pressurized fluid to a priority flow divider 26 which directs fluid to the valve 14 of the steering system 10 and excess flow to other vehicle systems, such as an implement system 28. The implement portion 28 of the fluid power system 10 is shown in block diagram in FIG. 1 while a steering portion 29 is shown in greater detail.

The present invention provides means 30 for automatically, controllably supplying motive power to the valve 14 prior to movement of the valve 14 from the first position in response to movement of the steering wheel 12 a preselected amount between the first and second positions. The supply means 30 is connected for supplying all available fluid to the implement portion 28 when the steering wheel 12 is moved less than a preselected amount and for supplying a demanded portion of the available fluid to the steering portion 29 in response to the steering wheel 12 moving more than a preselected amount. The supply means 30 eliminates any delay between the shifting of the valve 14 and the availability of pressurized fluid at the valve 14 for quick, responsive steering by supplying pressurized fluid to the valve 14 prior to shifting or opening the valve 14 for passing fluid.

Referring to FIG. 1, the supply means 30 preferably includes a control device 32 which is connected to the valve 14 and movable between a first position at which motive power to the valve 14 is blocked and a second position at which motive power is communicated between the pump 20 and valve 14. The control device 32 is preferably a fluid control valve 34 which is operated by a solenoid 36. The solenoid 36 deenergizes and the control valve 34 shifts from the first position to the second position to communicate motive power to the valve 14. By deenergizing the solenoid 36 and moving the control valve 34 to the second position before the valve 14 moves from the first position to the second position, pressurized fluid for steering is always available at the valve 14 before the valve 14 moves from the first position to the second position.

The supply means 30 also includes sensing and signal generating means 38 for sensing movement of the steering device 12, delivering a control signal to the control device 32 and moving the control device 32 towards the second position. The sensing-signalling means 38 is operably connected to actuate the control device 32 in response to a preselected amount of movement of the steering device 12.

The sensing-signalling means 38 includes sensing-generating means 40 for sensing movement of the steering wheel 12 and generating a signal in response to the movement and means 42 for receiving the signal from the sensing-generating means 40 and generating the control signal.

Referring to FIG. 2, the sensing-generating means 40 includes a member 46 in contact with a rotating portion 48 of the steering wheel 12 and rotatable therewith. A disc 50 is connected to the member 46 and rotates with the member 46. The disc 50 preferably has a plurality of notches or teeth 52 or the mechanical, optical or magnetic equivalent thereof spaced about the periphery. The member 46 and rotating portion 48 preferably have meshing teeth 52. The disc 50 rotates at a faster rate than the rotating portion 48 and thus magnifies any rotation of the steering wheel 12. For example, the rotating portion 48 may have a diameter of three inches (7.62 cm), the member 46 a diameter of one-half inch (1.27 cm) and the disc 50 a diameter of two inches (5.08 cm). In this construction the disc 50 rotates six times for each revolution of the rotating portion 48 or six degrees for each degree of steering wheel rotation.

The sensing-generating means 40 also includes a detecting unit 54. The detecting unit 54 is preferably an infrared opto-interrupter on mechanical, optical or magnetic equipment which generates a signal in response to rotation of the disc teeth 52.

Referring to FIG. 3, the sensing-generating means 40 alternately includes the detecting unit 54' and an encoder disc 60 which is connected to the steering wheel 12' and rotatable therewith. The encoder 60 has a plurality of teeth 62 spaced about the periphery. The encoder disc 60 can be of other constructions for use with other types of detectors.

Referring to FIGS. 1 and 5 the opto-interrupter 54 is preferably a General Electric H13B1 which consists of an infrared light emitting diode 64 and a Photo-Darlington transistor 66 separated by a short gap 68. The diode 64 continuously emits light and when the disc 50 or 60 moves into the gap 68, the light is alternately blocked and transmitted to the Photo-Darlington 66 turning it on and off.

The cathode of the diode 64 and emitter of the transistor 66 are tied together and connected to a negative bus line 69. The anode of the diode 64 is connected through a current limiting resistor 70 to a positive bus line 71 and the collector of the transistor 66 is connected to the bus line 71 through a current limiting resistor 72. The transistor 66 and resistor 72 are connected at point "A".

The positive bus line 71 is connected via resistor 73 and diode 74 to a voltage source such as the battery or generator of the lift truck 18. A zener diode 75 is connected at one end to the negative bus line 69 and at the other end to the positive bus line 71 and resistor 73. A capacitor 76 is connected in parallel with the zener diode 75. The capacitor 76, resistor 73, and diodes 74 and 75 form a power supply which reduces the output of a typical 48 volt lift truck power supply to a 12-volt level or other level compatible with the receiving means 42 as is more fully explained below.

The receiving means 42 is connected to the sensing-generating means 40 at a point "A" and receives the signal from the sensing-generating means 40 at point "A". The signals labeled A-G in FIG. 6 represent the signals at the corresponding points A-G in FIG. 5. The solenoid 36 is connected to the receiving means 42 at point "E". The receiving means 42 translates signal "A" into signal "E" which deenergizes the solenoid 36 thereby supplying fluid power to the modulatable valve 14. A time delay before turn-off keeps fluid power supplied ontinuously during the frequent movement of the steering wheel 12 that occurs during normal steering.

Connected to point "A" is a means, such as a Schmitt trigger 77, for changing a slow rising waveform, such as "A", to a fast rising pulse waveform, such as "B". The trigger 77 saturates in a high (12 VDC) or low (0 VDC) state as determined by the relationship between the input voltage "A" and a trip point voltage applied to a reference input 78. The trip point voltage is determined by resistors 79,80,81 and 82. Resistor 79 is connected between point "B" and the reference input 78, resistors 81 and 82 are connected in series between the bus lines 69 and 71, and resistor 80 is connected at one end to the reference input 78 and at the other end to resistors 81 and 82. The input "A" and output "B" of the Schmitt trigger 77 are shown in FIG. 6.

Connected between points "B" and "C" are a leading edge triggered pulse generator 83 and a lagging edge triggered pulse generator 84. Pulse generator 83 consists of an operational amplifier 85 having dal inputs and an output. A diode 86 is connected between the output and point "C". Resistors 87 and 88 are connected to the first input and resistors 89 and 90 and capacitor 91 connected to the second input. Resistors 88 and 90 are also connected to point "B". Resistor 89 is connected to the positive bus 71 and resistor 87 and capacitor 91 are connected to the negative bus 69.

Pulse generator 84 consists of an operational amplifier 92 having dual inputs and an output. A diode 93 is connected between the output and point "C". Resistors 94 and 95 and capacitor 96 are connected to the first input and resistors 97 and 98 are connected to the second input. Resistor 97 is connected to the positive bus 71 and resistor 94 and capacitor 96 are connected to the negative bus 69. Resistors 95 and 98 are also connected to point "B".

The combined outputs of the two pulse generators 83,84 appear at point "C" as a short negative going pulse "C" for every edge of the Schmitt trigger output "B" as shown in FIG. 6.

Points "C" and "F" are connected by a resistor 99. Point "F" is connected to the positive bus 71 by resistor 100 and to the negative bus 69 by capacitor 101. Point "F" is also connected to one input of an operational amplifier 102 the output of which is point "D" and the other input of which is point "G". Point "G" is connected between two series resistors 103 and 104, one of which is connected to the positive bus 71 and the other of which is connected to the negative bus 69. By this construction a missing pulse detector 105 is formed which keeps signal "D" high as long as pulses from signal "C" are present and allows signal "D" to go low when pulses are missing as shown in FIG. 6.

A diode 106 is connected to point "D" and a resistor 107 is connected in series with the diode 106. A resistor 108 is connected to the resistor 106 and to the negative bus line 69. The resistors 107 and 108 are connected to the base of a Darlington transistor 109 which has its emitter connected to the negative bus line and its collector connected to point "E".

The solenoid 36 is connected to point "E" and to the positive bus line 71. A series diode 110 and resistor 111 are connected in parallel with the solenoid 36. The signal "E" is the control signal.

Referring to FIG. 4, the supply means 30' includes the sensing-generating means 40' and the receiving means 42' modified to operate motor driven pump 20' instead of the solenoid 36. The modification is made by connecting the motor 20 to point "E" of FIG. 5 and to the positive bus line 71.

Referring to FIG. 5, one skilled in the art can readily choose appropriate components for the circuitry of FIG. 5 once the power requirements of the solenoid 36 or motor driven pump 20' are known. In a preferred embodiment, the components were as follows:

| Component | Reference Number | Model Number |
| --- | --- | --- |
| opto-interrupter | 54 | H13B1 |
| Darlington transistor | 109 | TIP122 |
| Op Amps | 77,85,92,102 | ¼ each LM224 |
| Diode | 75 | 1N4742 |
| Diode | 74,86,93,106,110 | 1N4005 each |

| Component | Reference Number | Value |
| --- | --- | --- |
| Capacitor | 76 | 10 uf |
| Capacitor | 91 | 0.001 uf |
| Capacitor | 96 | 0.001 uf |
| Capacitor | 101 | 0.01 uf |
| Resistor | 70, 107 | 1.2 K |
| Resistor | 72 | 22 K |
| Resistor | 73 | 750 |
| Resistor | 79,80 | 56 K |
| Resistor | 81, 82, 108 | 2.2 K |
| Resistor | 87, 89, 94, 97 | 100 K |
| Resistor | 88, 90, 95, 98 | 10 K |
| Resistor | 99 | 2.7 K |
| Resistor | 100 | 1.2 M |
| Resistor | 103 | 12 K |
| Resistor | 104 | 68 K |
| Resistor | 111 | 120 |

INDUSTRIAL APPLICABILITY

The present invention operates automatically to quickly supply fluid power for steering when an operator rotates the steering wheel 12 to the left or right a preselected amount to steer the lift truck 18. In making a right turn, for example, the operator rotates the steering wheel 12 to the right causing the sensing-signalling means 38 to actuate control valve 34 (FIG. 1) or motor driven pump 20' (FIG. 4) prior to shifting valve 14.

Referring to FIG. 2, the instant the steering wheel 12 begins to rotate, the rotating portion 48 begins to rotate and, in turn, causes member 46 to rotate. The disc 50 rotates in unison with member 46 so that for each degree of revolution of the wheel 12, the disc 50 rotates approximately six degrees. The disc teeth 52 intermittently interrupt the infrared light being transmitted from the light emitting diode 64 to the Photo-Darlington transistor 66 in the optointerrupter pick-up unit 54 (FIGS. 1 and 5). The teeth 52 pass through the gap 68 thereby interrupting the light and causing signal "A" to be generated.

Referring to FIG. 3, the encoder disc 60 performs the same function as the disc 50 in that the encoder teeth 62 pass through the gap 68' intermittently interrupting the light causing signal "A" to be generated.

Signal "A" is generated whenever the wheel 12 moves at all. However, the control signal "F" lags signal "A" and appears a preselected time after signal "A" begins and disappears a preselected time after the occurrence of signal "A". These delays allow the wheel 12 to rotate a preselected amount, preferably 1½ to 3 degrees in the free play range, without supplying fluid power to the valve 14 which only shifts when the wheel 12 rotates 5 to 7 degrees. This prevents unnecessarily supplying fluid power to the valve 14. By generating signal "F" a short time after the wheel 12 has stopped rotating, fluid power is available to valve 14 which is required during the frequent steering maneuvers normally encountered during lift truck operation.

eferring to FIGS. 5 and 6, the zener diode 75 maintains the positive bus line 71 and a 12 VDC potential relative to the negative line 69 which is at a 0 VDC potential. The capacitor 76 connected in parallel with the diode 75 acts as a filter.

Prior to rotating the steering wheel 12, points A and G are high at about 10 VDC, points C, E and F are high at about 12 VDC, and points B and D are low or about 0 VDC. As the wheel 12 rotates signal A oscillates with the frequency of oscillation varying with the speed of rotation. Signal "A" is not direction sensitive and the valve 14 is used to match the direction of steering wheel rotation to the direction of travel of the lift truck 18.

Signal A is routed to the Schmitt trigger 77 and saturates the trigger 77 in a high or low state depending on the value of signal A in relation to the trip point voltage. The trip voltages are preferably 3 VDC and 9 VDC, but are varied to desired levels by varying resistors 79, 80, 81 and 82. The output of the trigger 77 is signal "B". Signal "B" is a square wave pulse which goes from a normal low to high when signal A reaches the 3 VDC trip point and returns to low when the 9 VDC trip point is reached. Thus, signal "B" is a noise free square wave which has leading and lagging edges which are used to trigger the edge triggered pulse generators 83,84.

The leading edge detector 83 switches from a normal high state to a low state as signal "B" goes from low to high. The detector 83 remains low for about 5 milliseconds before returning to its high state. The lagging edge detector 84 switches from a normal high state to a low state as signal "B" goes from high to low. The detector 84 remains low for about 5 milliseconds before returning to its high state. Thus, signal "C" consists of a series of narrow, low value pulses.

Signal "C" passes through resistor 99 to point "F" which is normally high but which goes low when "C" goes low. The capacitor 101 which is connected to point "F" and resistor 99 form an R-C timing circuit which causes signal "C" to rise only slightly when signal "C" goes from low to high. This causes signal "D" to stay high until capacitor 101 charges up to about 63 percent of the positive bus line voltage which takes approximately 750 milliseconds. If another low pulse "C" appears during this time, the capacitor 101 will be shorted and the timing sequence will begin again. Signal "D" is low only when a pulse "C" is missing for 750 milliseconds.

Signal "E" is the mirror image of signal "D" and is low when "D" is high which occurs after the wheel 12 is rotated a preselected amount and for 750 milliseconds thereafter. This prolongs the on time for the solenoid 36, motor driven pump 20' or other apparatus connected at point "E".

It is more apparent that the time delay between the initial turning of the steering wheel 12 and the deactivation of the solenoid 36 is controlled by varying the space between the teeth 52 or 62. By spacing the teeth 52,62 so that there are 1½ or 3 degrees from the leading edge of one tooth to the leading edge of the next tooth, the steering wheel 12 rotates up to 1½ or 3 degrees before signal "E" switches from high to low.

Other aspects, objects and advantages of this invention can be obtained from a study of the drawings, the disclosure and the appended claims.

What is claimed is:

1. A fluid power system (10) comprising:
   a valve (14);
   a movable steering control device (12) connected to actuate the valve (14); and
   means (30) operably connected in the system (10) for supplying pressurized fluid to the valve (14) prior to actuation of the valve (14) in response to a preselected amount of movement of the steering device (12).

2. The system (10) of claim 1, wherein the system (10) includes an implement portion (28) and a steering portion (29) and the supply means (30) is connected for supplying all available fluid to the implement portion (28) when the steering member (12) is moved less than a preselected amount and for supplying a demanded portion of the available fluid to the steering portion (29) in response to the steering member (12) moving more than a preselected amount.

3. The system (10) of claim 1, including sensing and signal generating means (38) operably connected to actuate a motor driven pump (20) in response to a preselected amount of movement of the steering device (12).

4. The system (10) of claim 1 including sensing and signal generating means (38) operably connected to actuate another valve (34) in response to a preselected amount of movement of the steering device (12).

5. In a vehicle (18) having a fluid power system (10) including a movable steering control device (12) connected to actuate a valve (14), the improvement comprising:
   means (30) operably connected in the system (10) for supplying pressurized fluid to the valve (14) prior to actuation of the valve (14) in response to a preselected amount of movement of the steering device (12).

6. A fluid power system (10) comprising:
   a steering control device (12) movable between a first neutral position and a second steering demand position;
   a valve (14) connected to the steering control device (12) and movable between a first position at which motive power for steering is blocked and a second position at which the valve (14) communicates motive power for steering, said valve (14) controllably moving from the first position to the second position only in response to the steering device (12) moving to the second position; and
   means (30) for automatically, controllably supplying motive power to the valve (14) prior to movement of the valve (14) from the first position in response to movement of the steering control device (12) toward the second position.

7. A fluid power system (10), as set forth in claim 6 wherein the supply means (30) comprises:
   a control device (32) connected to the valve (14) and movable between a first position at which motive power to the valve (14) is blocked and a second position at which motive power is communicated to the valve (14); and
   sensing-signalling means (38) for sensing movement of the steering device (12), delivering a control signal to the control device (32), and moving the control device (32) towards the second position.

8. A fluid power system (10), as set forth in claim 7, wherein the control device (32) is a solenoid operated fluid control valve (34), said control valve (34) controllably directing fluid power to the valve (14) in response to receiving the control signal from the sensing-signalling means (38).

9. A fluid power system (10), as set forth in claim 7, wherein the sensing-signalling means (38) comprises:
   sensing-generating means (40) for sensing movement of the steering control device (12) and generating a signal in response thereto; and
   means (42) for receiving the signal from the sensing-generating means (40) and generating the control signal.

10. A fluid power system (10), as set forth in claim 6, wherein the supply means (30) includes an electrically driven pump (20) controllably delivering fluid power to the valve (14) in response to being energized by movement of the steering device (12) a preselected amount.

* * * * *

Disclaimer 4,184,333.—*James G. Blaha,* Painesville; *Grant C. Melocik,* Chardon and *John E. Wible,* Painesville, Ohio. FLUID POWER SYSTEM. Patent dated Jan. 22, 1980. Disclaimer filed Feb. 23, 1981, by the assignee, *Towmotor Corp.*

Hereby enters this disclaimer to claims 1, 4 and 5 of said patent.
[*Official Gazette April 14, 1981.*]